United States Patent
Shur et al.

(10) Patent No.: US 7,958,231 B2
(45) Date of Patent: *Jun. 7, 2011

(54) METHOD FOR REDIRECTION OF WEB STREAMING CLIENTS USING LIGHTWEIGHT AVAILABLE BANDWIDTH MEASUREMENT

(75) Inventors: David Shur, Holmdel, NJ (US); Aleksandr Zelezniak, Matawan, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 128 days.

This patent is subject to a terminal disclaimer.

(21) Appl. No.: 12/268,431

(22) Filed: Nov. 10, 2008

(65) Prior Publication Data

US 2009/0063682 A1    Mar. 5, 2009

Related U.S. Application Data

(62) Division of application No. 10/747,751, filed on Dec. 29, 2003, now Pat. No. 7,451,251.

(51) Int. Cl.
*G06F 15/173* (2006.01)
*G06F 15/16* (2006.01)

(52) U.S. Cl. ......... 709/224; 709/203; 709/226; 709/235

(58) Field of Classification Search .................. None
See application file for complete search history.

(56) References Cited

U.S. PATENT DOCUMENTS

| | | | |
|---|---|---|---|
| 6,061,722 A * | 5/2000 | Lipa et al. | 709/224 |
| 6,424,993 B1 | 7/2002 | Weber | |
| 6,449,647 B1 | 9/2002 | Colby et al. | |
| 6,862,624 B2 | 3/2005 | Colby et al. | |
| 7,451,251 B2 | 11/2008 | Shur et al. | |
| 7,765,340 B2 | 7/2010 | Shur et al. | |
| 2001/0044835 A1 | 11/2001 | Schober et al. | |
| 2003/0065763 A1 | 4/2003 | Swildens et al. | |
| 2003/0126266 A1 * | 7/2003 | Peles | 709/228 |
| 2003/0147386 A1 * | 8/2003 | Zhang et al. | 370/390 |
| 2004/0049574 A1 | 3/2004 | Watson et al. | |
| 2004/0128396 A1 | 7/2004 | Patrick et al. | |
| 2004/0240431 A1 * | 12/2004 | Makowski et al. | 370/352 |
| 2005/0105475 A1 | 5/2005 | Norrgard et al. | |
| 2006/0146820 A1 | 7/2006 | Friedman et al. | |

FOREIGN PATENT DOCUMENTS

| | | |
|---|---|---|
| WO | WO-02/27543 A2 | 4/2002 |
| WO | WO-03/075527 A1 | 9/2003 |
| WO | WO-03/098464 A1 | 11/2003 |

OTHER PUBLICATIONS

Decomposition of a TCP Packet; http://mike.passwall.com/networking/tcppacket.html; Aug. 7, 2000; 3 pages.*
Office Action for CA 2,487,228, Mar. 18, 2010.
"Decomposition of a TCP Packet," http://mike.passwall.com/networking/tcppacket.html, Aug. 7, 2000, 3 pages.

* cited by examiner

*Primary Examiner* — John B. Walsh

(57) ABSTRACT

In accordance with the teachings of the present invention, a method for selecting a server to provide content to a client is presented. A media controller receives a request from a client for content. The media controller instructs a plurality of servers each storing the content required by the client to perform a bandwidth measurement referred to in the disclosure as a bandwidth probe. The result of the bandwidth probe is communicated to the media controller. The media controller selects a server (i.e., an identified server) for communication with the client based on the result and communicates the selection in the form of a redirect command to the client. The client then communicates directly with the identified server.

19 Claims, 5 Drawing Sheets

METHOD FOR REDIRECTION OF WEB STREAMING CLIENTS USING LIGHTWEIGHT AVAILABLE BANDWIDTH MEASUREMENT

RELATED APPLICATION

This application is a divisional of U.S. patent application Ser. No. 10/747,751, filed Dec. 29, 2003, now U.S. Pat. No. 7,451,251 (currently allowed) which is incorporated herein by reference in its entirety.

BACKGROUND OF THE INVENTION

1. Field of the Invention

This invention relates to communication. Specifically, the present invention relates to content access.

2. Description of the Prior Art

Internet technology is pervasive and widely deployed. A large variety of content may be accessed over the Internet. The content is often stored in servers. A client machine communicates with a server to access the content.

As the Internet continues to expand, a large volume of clients attempt to access content on the Internet. This may result in a bottleneck if the clients are each attempting to access content from the same server. As a result, in conventional systems, the same content is often deployed on multiple servers. In addition to enabling more clients to get simultaneous access to the data, deploying the content on multiple servers often has ancillary benefits, such as system redundancy, greater security, etc.

However, the server is not the only bottleneck. The communication path from the client to the server may also serve as a bottleneck for communication. In addition, while there are some techniques for load balancing, the primary server is often disproportionately loaded relative to the other servers. As a result, the client experiences a slow response time either because of the disproportionate loading of a server or because of bottlenecks in the communication path.

Thus, there is a need for a method of discerning which server will provide the best response time to a client. There is the need for a method of determining which communication path will provide the best response time and throughput to a client. Lastly, there is a need for a method of determining which client in combination with the communication path will provide the best response time to a client.

SUMMARY OF THE INVENTION

A method is implemented that determines which server in a sequence of servers will provide the best response time for a client accessing the server. A bandwidth probe is implemented. In one embodiment, the bandwidth probe provides a mechanism for testing the server response and the communication path throughput to determine which server and/or communication path will have the best response time. As a result, the probe provides a quick and accurate way of measuring the response time of the server in combination with the communication path.

A method of communicating comprises the steps of receiving a communication from a client; instructing at least one server to begin a bandwidth probe in response to receiving the communication from the client; receiving results of the bandwidth probe in response to instructing the at least one server; and sending a redirect message to the client in response to receiving the results of the bandwidth probe.

A method of communicating comprises the steps of receiving a start packet; receiving a train of consecutive packets; receiving an end packet; computing time dispersion in response to receiving the start packet, receiving the train of consecutive packets, and receiving the end packet; and communicating a result in response to computing the time dispersion, wherein a server is selected for access in response to communicating the result.

A method of accessing a server comprises the steps of receiving an access request from a client; instructing a plurality of servers to each operate a bandwidth method in response to receiving the access request, the bandwidth method determining available bandwidth; receiving a bandwidth indication from each of the plurality of servers; selecting an identified server in response to receiving the bandwidth indication from each of the plurality of servers; and redirecting the client to the identified server.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
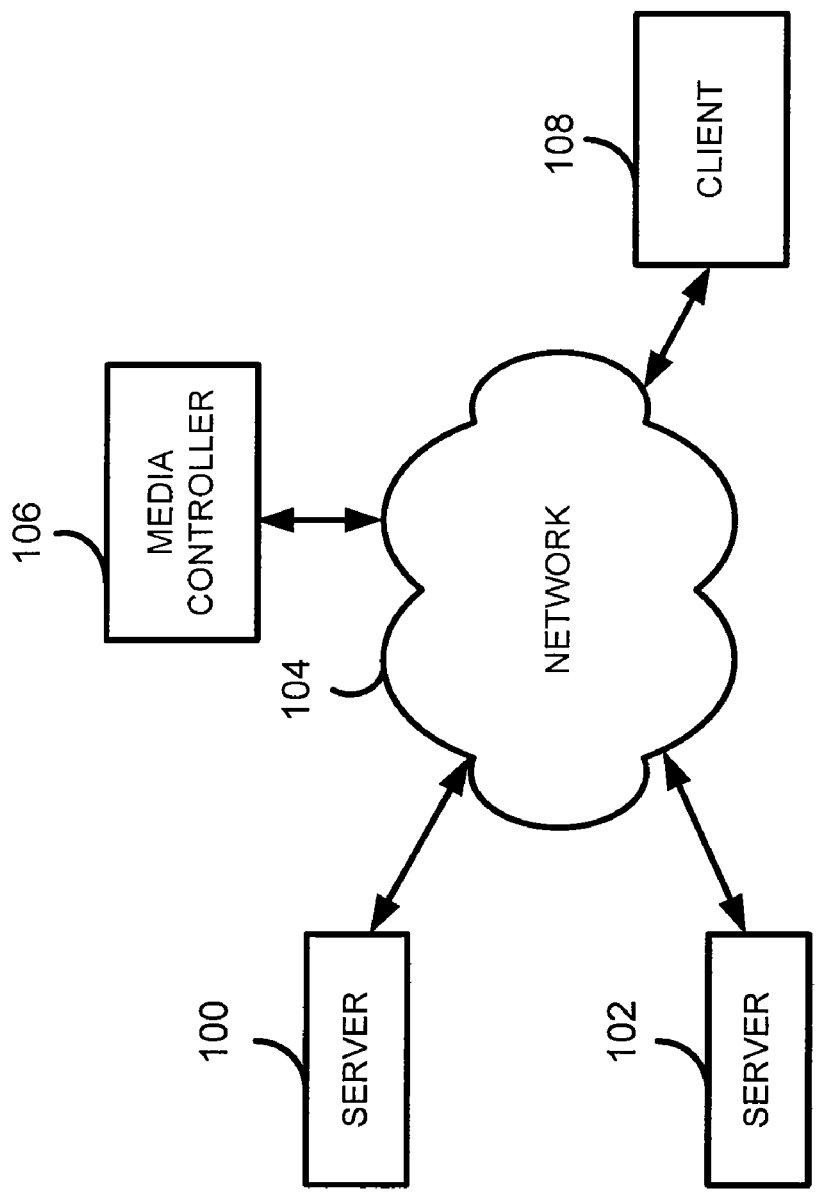
FIG. 1 displays a network implementing the teachings of the present invention.

FIG. 1 displays a network implementing the teachings of the present invention. Servers 100 and 102 are shown. In one embodiment of the present invention, servers 100 and 102 manage content. As such, servers 100 and 102 receive, store, provide access to, manipulate, and communicate content.

Servers 100 and 102 are in communication with network 104. Information, such as content, is communicated across network 104. In one embodiment, network 104 is implemented as a packet-switching network. In a second embodiment of the present invention, network 104 may be implemented as a circuit-switching network. In yet another embodiment of the present invention, network 104 may be implemented as an integrated packet and circuit switching network, a Local Area Network, a Wide Area Network, a wireless network, etc.

A media controller 106 is in communication with network 104. The media controller 106 represents any entity capable of controlling access to servers 100 and 102. The media controller 106 may be implemented in software, hardware, or in a combination of software and hardware.

A client 108 is in communication with the network 104. The client 108 represents a device used by an end-user to access resources in the network 104. The client 108 may be implemented in software, hardware, or in a combination of software and hardware.

Figure 2:
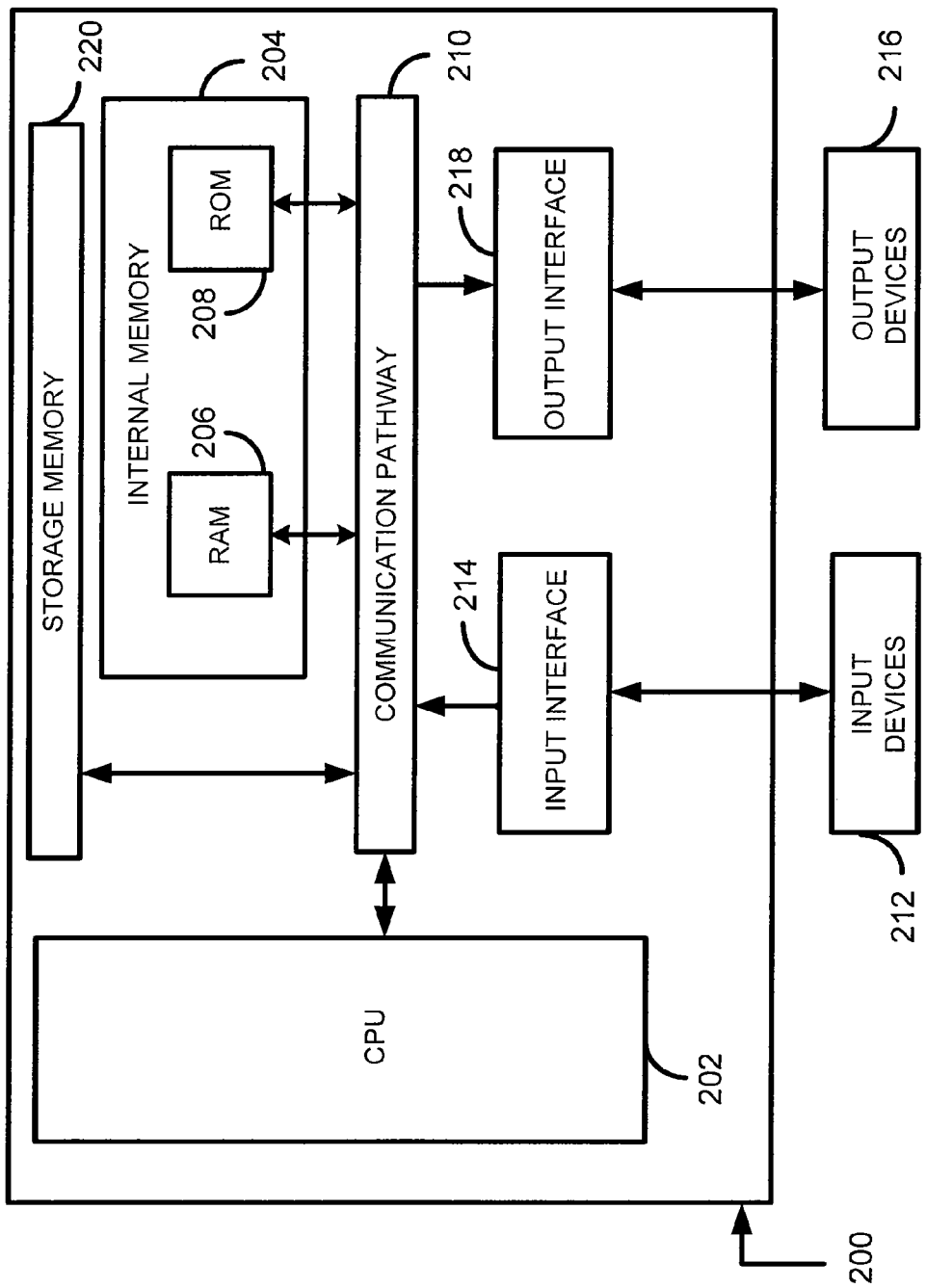
FIG. 2 displays a block diagram of a computer implemented in accordance with the teachings of the present invention.

FIG. 2 displays a computer architecture implemented in accordance with the teachings of the present invention. The computer architecture 200 of FIG. 2 may used to implement the server 100, the server 102, the network 104, the media controller 106, and/or the client 108 of FIG. 1. A central processing unit (CPU) 202 functions as the brain of the computer architecture 200. Internal memory 204 (e.q., a computer-readable medium) is shown. The internal memory 204 includes short-term memory 206 and long-term memory 208. The short-term memory 206 may be a Random Access Memory (RAM) or a memory cache used for staging information. The long-term memory 208 may be a Read Only Memory (ROM) or an alternative form of memory used for storing information. Storage memory 220 (e.g., a computer-readable medium) may be any memory residing within the computer architecture 200 other than internal memory 204. In one embodiment of the present invention, storage memory 220 is implemented with a hard drive. A communication pathway 210 is used to communicate information within computer architecture 200. In addition, the communication pathway 210 may be connected to interfaces, which communicate information out of the computer architecture 200 or receive information into the computer architecture 200.

Input devices, such as tactile input device, joystick, keyboards, microphone, communication connections, or a mouse, are shown as 212. The input devices 212 interface with the system through an input interface 214. Output devices, such as a monitor, speakers, communications connections, etc., are shown as 216. The output devices 216 communicate with computer architecture 200 through an output interface 218.

Figure 3:
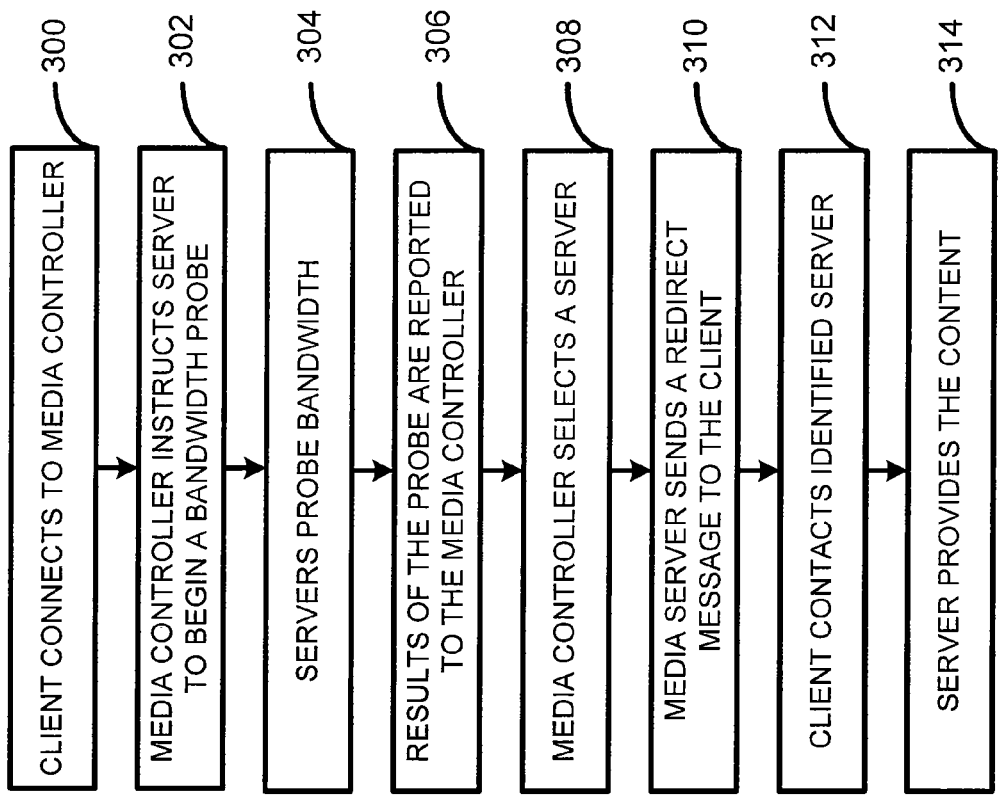
FIG. 3 displays a flow diagram depicting a method implemented in accordance with the teachings of the present invention.

FIG. 3 displays a flow diagram depicting a method implemented in accordance with the teachings of the present invention. FIG. 1 will be discussed in conjunction with FIG. 3. At step 300, the client 108 connects to the media controller 106. For example, the media controller 106 may be implemented as a proxy so that the client 108 is automatically directed to the media controller 106. In the alternative, the client 108 may be directed to the media controller 106 based on pre-configured criteria defined in the client 108. In one embodiment, the client 108 may issue a HyperText Transfer Protocol (HTTP) request or a Real Time Streaming Protocol (RTSP) request for content on server 100 and/or 102 and is directed to media controller 106.

At 302, the media controller 106 communicates with each server (100, 102) that has the content to begin a bandwidth probe. At step 304, the servers contacted by the media controller 106, such as servers 100 and 102, each launch software and/or hardware that probe communication bandwidth (i.e., bandwidth probe). Once the servers 100 and 102 have completed the bandwidth probe, each server 100 and 102 communicate the results of the bandwidth probe to the media controller 106 as stated at step 306. At step 308, the media controller 106 selects a server (100, 102). The media controller 106 may select the server 100 or 102 based on a variety of criteria. At step 310, the media controller 106 sends a redirect message to the client 108. The redirect message identifies which server 100 or 102 that the client 108 should use. As a result of the redirect message communicated at step 310, the client 108 contacts the identified server (100, 102) as stated at 312. At 314, the identified server 100 or 102 communicates the content to client 106.

Figure 4:
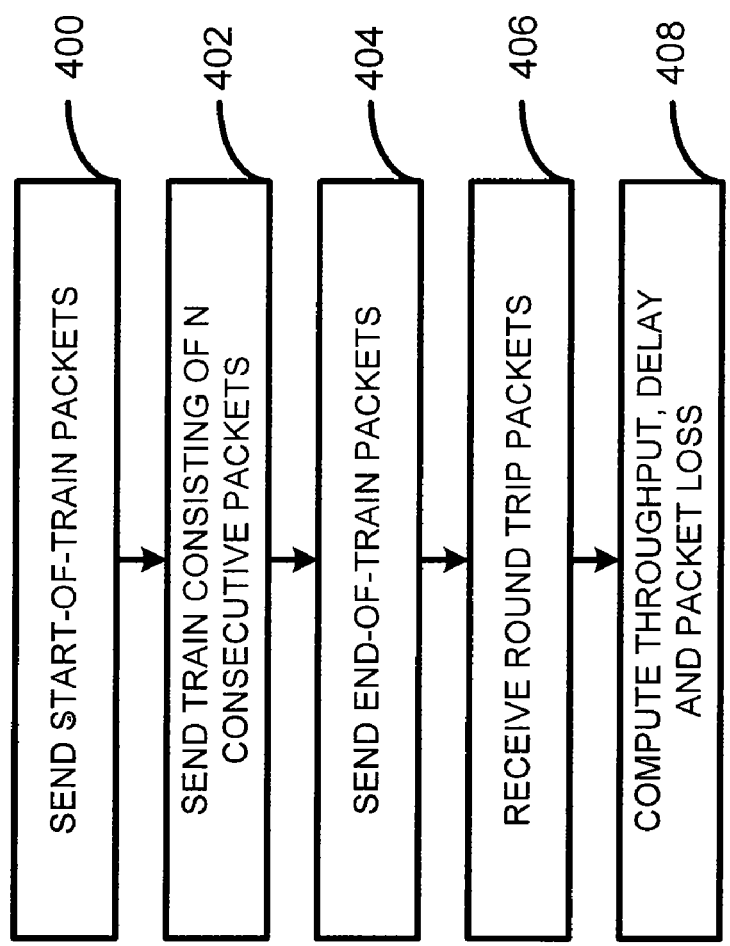
FIG. 4 displays a flow diagram depicting a bandwidth probe method implemented in accordance with the teachings of the present invention.

FIG. 4 displays a flow diagram depicting a bandwidth probe method implemented in accordance with the teachings of the present invention. In one embodiment, the method depicted in FIG. 4 implements the step 304 of FIG. 3 where the servers probe bandwidth. In one embodiment, the bandwidth probe method is implemented with a combination of hardware and/or software in a server, such as servers 100 and 102 of FIG. 1. However, it should be appreciated that the bandwidth probe may be implemented in other locations, such as in the media controller 106, the network 104, or in the client 108 of FIG. 1.

In one embodiment of the present invention, a bandwidth probe consists of a short "train" of packets transmitted at the speed of the outgoing interface to a given endpoint. The endpoint reports back on the arrival time of the start and end of the train. The spacing between the packets at the receiving endpoint is reflective of the available bandwidth along the path, allowing an estimate to be formed. There are several different variants of the bandwidth probe depending on the environment of the endpoint being probed. The variations of the bandwidth probe differ in the method used to record the time differences between packets in the train. For example, four variations of the bandwidth probe are presented: (1) an Internet Control Message Protocol (ICMP) echo with ICMP Timestamp Record may be used, (2) ICMP echo with Internet Protocol (IP) Timestamp Record may be used, (3) Transmission Control Protocol (TCP) Push/Reset with sender-based time recording may be used, and/or (4) ICMP echo with sender-based time recording may be used. It should be appreciated that although four bandwidth probe variations have been defined and described, other variations of bandwidth probes may be implemented and are within the scope of the present invention.

Referring to FIG. 4, at step 400, start-of-train packets are transmitted. FIG. 1 will be discussed in conjunction with FIG. 4. For example, in one embodiment of the present invention, the start-of-train packets are start packets compliant with one of the four bandwidth probe variations. For example, server 100 or 102 may send the start-of-train packets to client 108. The client 108 timestamps the start-of-train packets. At step 402, a train of N consecutive packets is transmitted. The train of N consecutive packets is consistent with one of the bandwidth probe variations. In one embodiment, the servers 100 and 102 send a train of consecutive packets to the client 108.

At step 404, end-of-train packets are sent. For example, end-of-train packets are sent from servers 100 and 102 to client 108. In one embodiment, the end-of-train packets are defined by one of the bandwidth probe variations. At 406, the servers 100 and 102 receive roundtrip packets communicated from the client 108. In one embodiment, the roundtrip packets are time stamped, for example, the receivers' timestamp the roundtrip packets. At 408, the servers 100 and 102 then use the roundtrip packets to compute bandwidth performance measures, such as throughput, delay, and packet loss.

Figure 5:
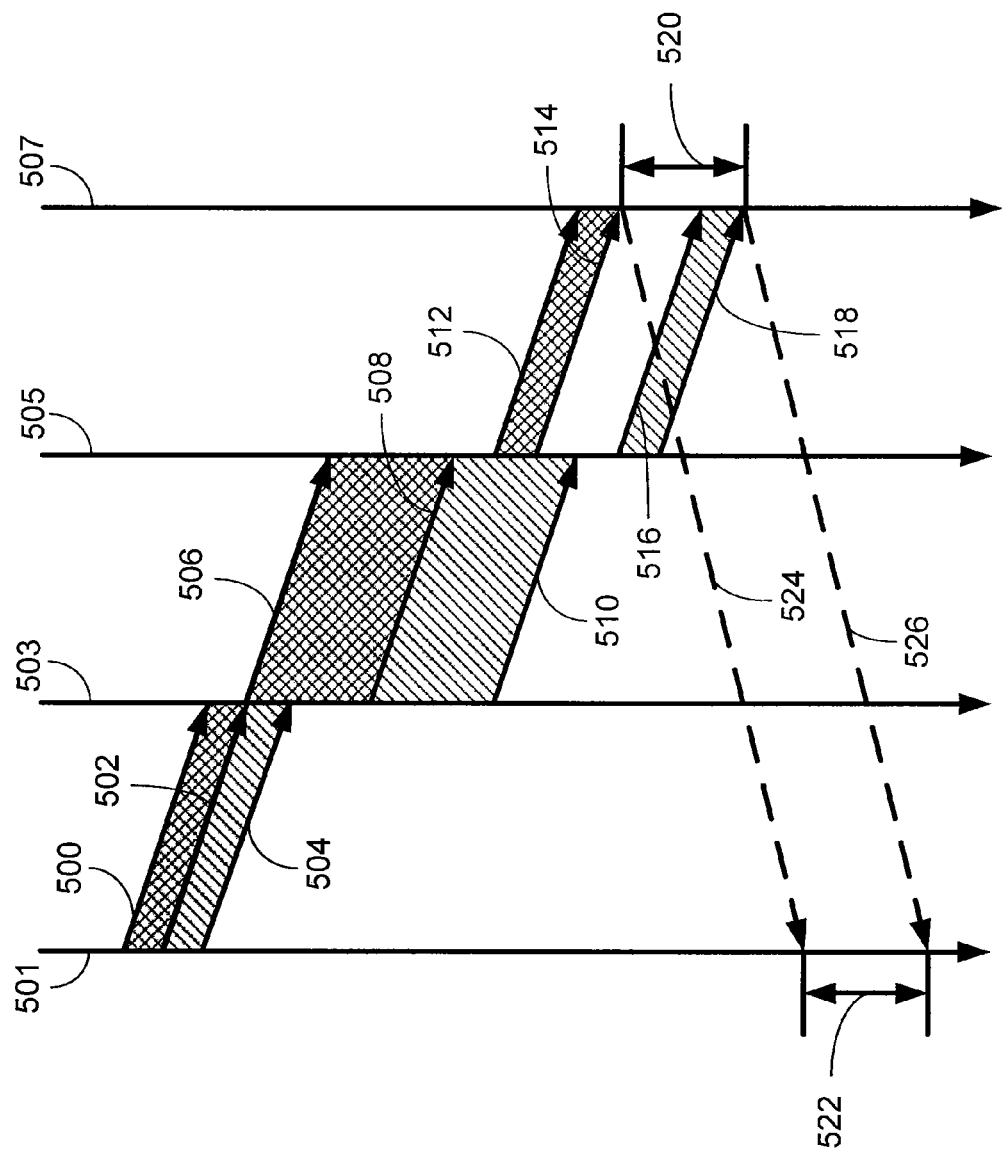
FIG. 5 displays a message diagram depicting the teachings of the present invention.

FIG. 5 displays a message flow diagram depicting the teachings of the present invention. In FIG. 5, vertical bar 501 represents a server machine, vertical bar 503 represents an intermediate communication device, vertical bar 505 represents an intermediate communication device, and vertical bar 507 represents a client machine. During operation, a packet is communicated from the server machine 501, through the intermediate communication device 503, to the intermediate communication device 505, and then to the client machine 507.

In FIG. 5, a train-of-packets is communicated from a server machine to a client machine and then returned back to the server machine. The train-of-packets is communicated between the server machine 501 and the intermediate communication device 503 as 500, 502, and 504. The train-ofpackets is then communicated between intermediate communication device 503 and intermediate communication device 505 as 506, 508, and 510. As shown by the separation of 506, 508, and 510, the speed between intermediate communication device 503 and intermediate communication device 505 is slower. Lastly, the train-of-packets is communicated between the intermediate communication device 505 and the client machine 507 as 512, 514, 516, and 518. The train-of-packets is then communicated back from the client machine to the server machine where the train-of-packets is time stamped as shown by 524 and 526.

In one embodiment of the present invention, the train-of-packets 500, 502, 504, 506, 508, 510, 512, 514, 516, and 518 are used to represent start-of-train packets, a train of N consecutive packets, and end-of-train packets. The start-of-train packets and the end-of-train packets are time stamped at the client machine 507 and then again at the server machine 501. Using the start-of-train packets and the end-of-train packets at the client machine 507, the receiver time dispersion shown as 520 may be calculated. In addition, using the start-of-train packets and the end-of-train packets at the server machine 501, the sender time dispersion 522 may be calculated. For example, in the case where a time stamp is implemented, the time stamp may be used to calculate dispersion. Further, using the receiver time dispersion 520, number-of-packets sent and size-of-the-packets throughput may be calculated. In the case where the timestamp function is not available on the receiving node, the sender time dispersion 522 is used to calculate the throughput. Round trip delay and packet loss may also be calculated.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

It is, therefore, intended by the appended claims to cover any and all such applications, modifications, and embodiments within the scope of the present invention.

What is claimed is:

1. A method of communicating, comprising:
receiving a communication from a client;
instructing a plurality of servers to begin bandwidth probes in response to receiving the communication from the client;
receiving results of the bandwidth probes in response to instructing the plurality of servers;
selecting a selected server from the plurality of servers in response to receiving the results of the bandwidth probes, wherein the selecting is performed by a processor; and
sending a redirect message to the client in response to receiving the results of the bandwidth probes, wherein the redirect message comprises a message redirecting the client to the selected server.

2. The method of claim 1, wherein the receiving the communication comprises receiving a hypertext transfer protocol communication from the client.

3. The method of claim 1, wherein the receiving the communication comprises receiving a real time streaming protocol communication from the client.

4. The method of claim 1, wherein the instructing the plurality of servers includes communicating instructions to the plurality of servers.

5. The method of claim 1, further comprising:
computing a throughput in response to receiving the results of the bandwidth probes.

6. The method of claim 1, further comprising:
computing a delay in response to receiving the results of the bandwidth probes.

7. The method of claim 1, further comprising:
computing a packet loss in response to receiving the results of the bandwidth probes.

8. A method of communicating, comprising:
receiving a start packet;
receiving a train of consecutive packets, wherein the train of consecutive packets is compliant with an internet control message protocol echo with an internet control message protocol timestamp;
receiving an end packet;
computing a time dispersion in response to receiving the start packet, the train of consecutive packets, and the end packet, wherein the time dispersion is a difference in arrival time between the start packet and the end packet, and wherein the computing is performed by a processor; and
communicating a result in response to the computing the time dispersion, wherein a server is selected for access in response to the communicating the result.

9. The method of claim 8, wherein the time dispersion is a receiver time dispersion.

10. The method of claim 8, wherein the time dispersion is a sender time dispersion.

11. A method of communicating, comprising:
receiving a start packet;
receiving a train of consecutive packets, wherein the train of consecutive packets is compliant with an internet control message protocol echo with an internet protocol timestamp;
receiving an end packet;
computing a time dispersion in response to receiving the start packet, the train of consecutive packets, and the end packet, wherein the time dispersion is a difference in arrival time between the start packet and the end packet, and wherein the computing is performed by a processor; and
communicating a result in response to the computing the time dispersion, wherein a server is selected for access in response to the communicating the result.

12. A method of communicating, comprising:
receiving a start packet;
receiving a train of consecutive packets, wherein the train of consecutive packets is compliant with an internet control message protocol echo with a sender-based time recording;
receiving an end packet;
computing a time dispersion in response to receiving the start packet, the train of consecutive packets, and the end packet, wherein the time dispersion is a difference in arrival time between the start packet and the end packet, and wherein the computing is performed by a processor; and
communicating a result in response to the computing the time dispersion, wherein a server is selected for access in response to the communicating the result.

13. A non-transitory computer-readable medium having stored thereon a plurality of instructions, the plurality of instructions including instructions which, when executed by a processor, cause the processor to perform a method of communicating, comprising:

receiving a communication from a client;

instructing a plurality of servers to begin bandwidth probes in response to receiving the communication from the client;

receiving results of the bandwidth probes in response to instructing the plurality of servers;

selecting a selected server from the plurality of servers in response to receiving the results of the bandwidth probes; and sending a redirect message to the client in response to receiving the results of the bandwidth probes, wherein the redirect message comprises a message redirecting the client to the selected server.

14. The non-transitory computer-readable medium of claim 13, wherein the receiving the communication comprises receiving a hypertext transfer protocol communication from the client.

15. The non-transitory computer-readable medium of claim 13, wherein the receiving the communication comprises receiving a real time streaming protocol communication from the client.

16. The non-transitory computer-readable medium of claim 13, wherein the instructing the plurality of servers includes communicating instructions to the plurality of servers.

17. The non-transitory computer-readable medium of claim 13, further comprising:

computing a throughput in response to receiving the results of the bandwidth probes.

18. The non-transitory computer-readable medium of claim 13, further comprising:

computing a delay in response to receiving the results of the bandwidth probes.

19. The non-transitory computer-readable medium of claim 13, further comprising:

computing a packet loss in response to receiving the results of the bandwidth probes.

* * * * *